(12) United States Patent  
Nayak et al.

(10) Patent No.: US 12,462,579 B2  
(45) Date of Patent: Nov. 4, 2025

(54) VEHICLE EMISSION MEASUREMENT

(71) Applicant: HERE Global B.V., Eindhoven (NL)

(72) Inventors: Amarnath Nayak, Mumbai (IN);  
Bruce Bernhardt, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 386 days.

(21) Appl. No.: 18/087,388

(22) Filed: Dec. 22, 2022

(65) Prior Publication Data

US 2024/0212359 A1 Jun. 27, 2024

(51) Int. Cl.
| | |
|---|---|
| *G01C 21/34* | (2006.01) |
| *G06T 7/10* | (2017.01) |
| *G06V 10/26* | (2022.01) |
| *G06V 10/764* | (2022.01) |

(Continued)

(52) U.S. Cl.  
CPC .......... *G06V 20/58* (2022.01); *G01C 21/3469* (2013.01); *G06T 7/10* (2017.01); *G06V 10/26* (2022.01); *G06V 10/82* (2022.01); *G06T 2207/20081* (2013.01); *G06T 2207/20084* (2013.01); *G06T 2207/20132* (2013.01); *G06T 2207/30236* (2013.01); *G06T 2207/30242* (2013.01); *G06T 2207/30252* (2013.01); *G06V 2201/08* (2022.01)

(58) Field of Classification Search  
CPC ........ G06V 20/58; G06V 10/26; G06V 10/82; G06V 2201/08; G06V 10/764; G01C 21/3469; G06T 7/10; G06T 2207/20081; G06T 2207/20084; G06T 2207/20132; G06T 2207/30236; G06T 2207/30242; G06T 2207/30252  
See application file for complete search history.

(56) References Cited

U.S. PATENT DOCUMENTS 10,572,741 B2 *   2/2020   Huang ................... G06F 18/24  
11,880,996 B2 *   1/2024   Lim ........................ G06T 7/50  
(Continued)

FOREIGN PATENT DOCUMENTS

KR   20200127219 A   *   11/2020  
WO      2020065972 A1      4/2020

OTHER PUBLICATIONS

"Modeling of CO Emissions from Traffic Vehicles Using Artificial Neural Networks" Appl. Sci. 2019, 9, 313; doi:10.3390/app9020313.

(Continued)

*Primary Examiner* — Gregory A Morse  
*Assistant Examiner* — Ronde Lee Miller  
(74) *Attorney, Agent, or Firm* — Lempia Summerfield Katz LLC

(57) ABSTRACT

Systems and methods are described for the vehicle emission measurement. An example method may include receiving a plurality of images from a first vehicle traveling on a section of roadway, determining a quantity of surrounding vehicles from the plurality of images, determining a cropped image of at least one of the surrounding vehicles from the plurality of images, identifying a model of the at least one of the surrounding vehicles from the cropped image, and calculating an emission measurement factor for the section of roadway based on at least the quantity of surrounding vehicles for the at least one of the surrounding vehicles.

19 Claims, 9 Drawing Sheets

(51) Int. Cl.
*G06V 10/82* (2022.01)
*G06V 20/58* (2022.01)

(56) References Cited

U.S. PATENT DOCUMENTS

| | | | | |
|---|---|---|---|---|
| 2016/0042234 | A1* | 2/2016 | Chen | G08G 1/04 |
| | | | | 382/190 |
| 2018/0101177 | A1* | 4/2018 | Cohen | G05D 1/0246 |
| 2019/0278994 | A1* | 9/2019 | Bumpas | G06N 3/045 |
| 2020/0342430 | A1* | 10/2020 | Li | G06F 16/245 |
| 2020/0362784 | A1* | 11/2020 | De Smet | F02D 41/0235 |
| 2021/0210170 | A1 | 7/2021 | Gardner et al. | |
| 2022/0076440 | A1* | 3/2022 | Lim | G06V 20/56 |
| 2022/0358775 | A1* | 11/2022 | Hantehzadeh | G06T 7/0004 |
| 2023/0003537 | A1* | 1/2023 | Kapp | G08G 1/0145 |
| 2023/0087686 | A1* | 3/2023 | Bruns | G06V 10/764 |
| 2024/0071097 | A1* | 2/2024 | Fujiki | G08G 1/16 |
| 2024/0212359 | A1* | 6/2024 | Nayak | G01C 21/3469 |

OTHER PUBLICATIONS

"Predict the total co2 emissions a car produces using a machine learning"; https://www.neuraldesigner.com/learning/examples/car-co2-emissions; Accessed Oct. 28, 2022.

Hien, N.L.H.; Kor, A.-L. "Analysis and Prediction Model of Fuel Consumption and Carbon Dioxide Emissions of Light-Duty Vehicles" Appl. Sci. 2022, 12, 803. https://doi.org/10.3390/app12020803.

Mohanta; Nibedita "Mapping, calculating, and controlling carbon emissions" a href="https://www.geospatialworld.net/prime/special-features/mapping-calculating-and-controlling-carbon-emissions/;" target="_blank"https://www.geospatialworld.net/prime/special-features/mapping-calculating-and-controlling-carbon-emissions/;/a (Oct. 28, 2022).

Price, Thomas, "Machine Learning to Determine Type of Vehicle", Technical Disclosure Commons, (Dec. 7, 2017) http://www.tdcommons.org/dpubs_series/884.

* cited by examiner

VEHICLE EMISSION MEASUREMENT

FIELD

The following disclosure relates to the estimation of emission levels from one or more vehicles in a geographic region or section of roadway.

BACKGROUND

Carbon-based emissions are a major contributing factor for global warming and climate change. Some statistics indicate that the transport sector, including mostly motor vehicles, contributes about 14% of all carbon-based emissions. The infrastructure required for direct measurements of vehicle emissions are difficult and costly. Large scale estimation of emissions, such as through traffic levels alone, are inaccurate.

What is proposed is a techniques that estimates vehicle emissions more accurately estimates vehicle emissions than existing large scale techniques but also does not require an infrastructure to be established for the purpose of vehicle emission measurement.

SUMMARY

In one embodiment, a method for vehicle emission measurement includes receiving a plurality of images from a first vehicle traveling on a section of roadway, determining a quantity of surrounding vehicles from the plurality of images, determining a cropped image of at least one of the surrounding vehicles from the plurality of images, identifying a model of the at least one of the surrounding vehicles from the cropped image, and calculating an emission measurement factor for the section of roadway based on at least the quantity of surrounding vehicles for the at least one of the surrounding vehicles.

In one embodiment, an apparatus includes emission estimation controller including an emission estimation controller and three models. The emission estimation controller is configured to receive a plurality of images from a first vehicle traveling on a section of roadway. A first vehicle model, accessible by the emission estimation controller, is configured to determine a quantity of surrounding vehicles from the plurality of images. A second vehicle model, accessible by the emission estimation controller, is configured to identify a model of at least one of the surrounding vehicles from a cropped image identified from the plurality of images. A third vehicle model, accessible by the emission estimation controller, is configured to determine a type of vehicle of the at least one of the surrounding vehicles from the cropped image identified from the plurality of images, and the emission estimation controller is configured to calculate an emission measurement factor for the section of roadway based on the quantity of surrounding vehicles for the at least one of the surrounding vehicles and based on the model of the at least one surrounding vehicles or the type of vehicles.

In one embodiment, a non-transitory computer readable medium including instructions that when executed are configured to perform receiving an estimated emission value, storing the estimated emission value with location coordinates, receiving a route request from an origin to a destination, and generate a route from the origin to the destination based on the emission threshold factor.

BRIEF DESCRIPTIONS OF THE DRAWINGS

Exemplary embodiments of the present invention are described herein with reference to the following drawings.

DETAILED DESCRIPTION

All motor vehicles including internal combustion engines, or in some instances, other types of engines, expel emissions to the environment. The term vehicle emissions may include one or more of the following: hydrocarbons, volatile organic compounds (VOCs), carbon monoxide, carbon dioxide, methane, perfluorocarbons, sulfur oxides, sulfur hexafluoride, nitrogen oxides, and other particulates. The particulates may include miscellaneous particles of at least partially burned material have a diameter or other dimension of 1-1000 micrometers. Carbon monoxide is a product of incomplete combustion. When a fuel burns incompletely, carbon monoxide gas is a product of the combustion. Hydrocarbons include fuel that is combusted or partially burned. VOCs include organic material having a low boiling point. VOCs include chlorofluorocarbons (CFCs) and formaldehyde.

Many systems are in place to reduce or otherwise control vehicle emissions. Examples include catalytic converters, exhaust gas recirculation systems, or other devices. These vehicle emission reduction systems tend to be consistent across a model of motor vehicle. In other words, for a given model, all examples of the given model have substantially the same vehicle emissions. This is also true, but to a lesser extent, for the type of classification of motor vehicles. In other words, for a given classification of motor vehicle, for example compact car, all examples of the given classification have similar vehicle emissions. The vehicle emission levels that are substantially consistent across vehicle models and/or vehicle classifications may be utilized to estimate vehicle emissions for a geographic area.

The vehicle emissions may be measured in terms of the weight of the vehicle emissions. The vehicle emissions may be measured as the weight of the vehicle emissions per unit distance. The vehicle emissions may be measured as the weight of the vehicle emissions per unit distance. The vehicle emissions may be measured as the weight of the vehicle emissions per unit vehicle.

The vehicle emissions may be measured in terms of any one or a combination of the example components: hydrocarbons, volatile organic compounds (VOCs), carbon monoxide, sulfur oxides, nitrogen oxides, and other particulates. In addition, the vehicle measurements may be in terms of a carbon dioxide equivalent, CO2e, as a bundle of components expressed as a single number. One example bundle may include carbon dioxide (CO2), methane (CH4), nitrous oxide (N2O), hydrofluorocarbons (HFCs), perfluorocarbons (PFCs), sulfur hexafluoride (SF6), and nitrogen trifluoride (NF3). The other gases besides carbon dioxide are converted to equivalent amount of carbon dioxide in the carbon dioxide equivalent value. The effect of the other gases besides carbon dioxide are scaled to coefficients, which are compared to a unitary (1) value for carbon dioxide. Example measurements for the vehicle emissions may be Kg CO2e/Km and Kg CO2e/unit.

Figure 1A:
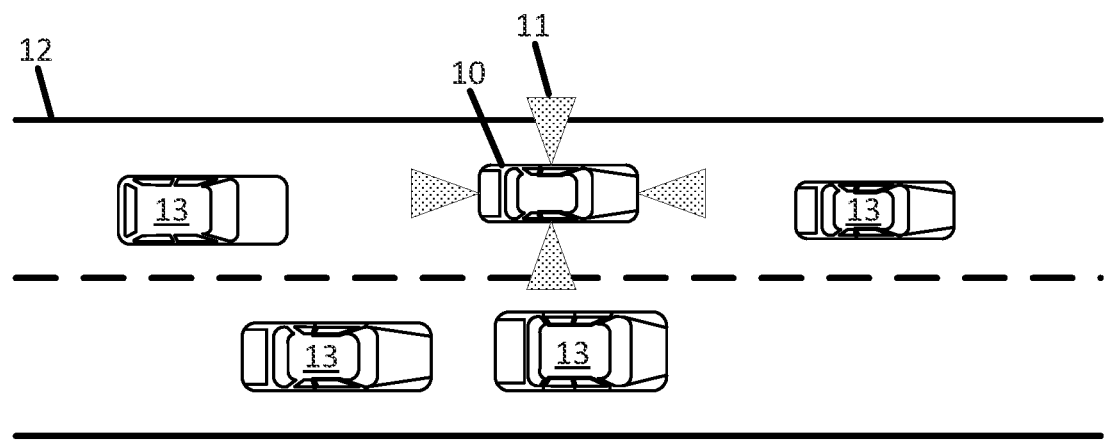
FIGS. 1A and 1B illustrate example road sections including a collection vehicle.
Figure 1B:
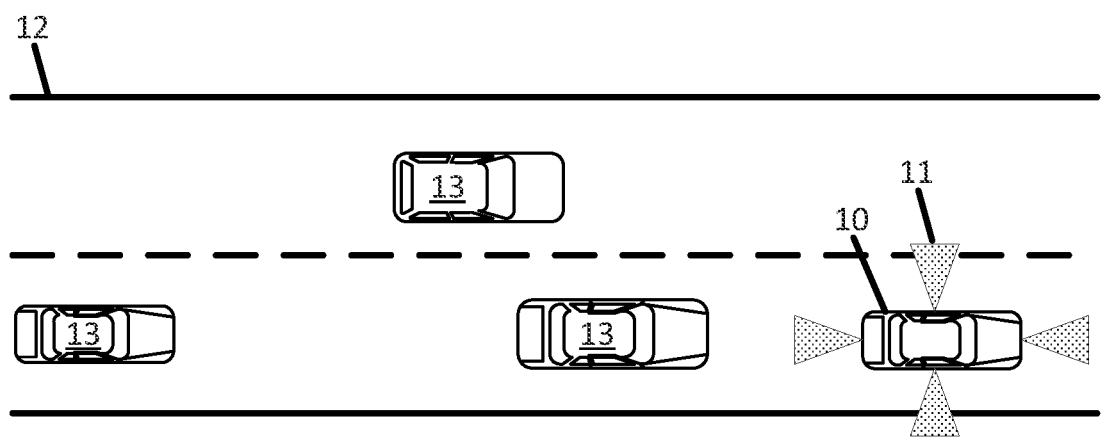

FIGS. 1A and 1B illustrate example road sections 12 including a collection vehicle 10. The collection vehicle 10 may include multiple sensors for collecting data in the environment along the road section 12. Collection vehicles are discussed in more detail below. The collection vehicle 10 illustrated in FIGS. 1A and 1B includes at least a camera and may include additional sensors including additional image collection devices. In some examples, the camera is rotatable and collects images from various angles around the collection vehicle 10. In other examples, multiple cameras that are fixed or static are used to collect images from various angles. FIGS. 1A and 1B illustrate example fields of view 11 for the cameras. Different fields of view may be used depending on the direction of the field of view 11 from the collection vehicle 10. A wider field of view (e.g., 90-135 degrees or greater than 90 degrees) may be used on the sides (e.g., driver side and passenger side) of the vehicle, and a narrower field of view (e.g., 45-90 degrees or less than 90 degrees). The field of view 11 may include one or more observed vehicles 13, depending on the relative locations of the collection vehicle 10 and the observed vehicles 13.

FIGS. 1A and 1B further illustrate that the collection vehicle 10 collects images at different locations along the road section 12. The collection vehicle 10 may change lanes, change speeds, pass observed vehicles 13 or be passed by observed vehicles 13. The subset of the observed vehicles 13 changes as the collection vehicle 10 travels along the road section 12.

The collection vehicle 10 may collect images by the one or more cameras according to a time interval or according to a distance interval. The collection vehicle 10 or camera may collect a set of image one for each distance interval. The distance interval may be 0.5 km, 1.0 km, 1 mile, or another interval. The distance interval may be greater than would permit the entire space along the road to be imaged. In other words, the cameras do not image the entire area along the roadway. Instead, the cameras sample the observed vehicles 13 at each distance interval. Alternatively or in addition, the time interval may be used for a similar effect at a time sampling interval. When time is used the distance between camera images varies according to speed of the collection vehicle 10.

A roadway may be divided into road section lengths having a predetermined length. The predetermined length may be 1 km. In the scenario that a road section (e.g., road link) is less than 1 km, one or more adjacent links may be combined to reach the predetermined length. The collection vehicle 10 may be instructed to collect image data a predetermined number of times (e.g., once) for each road section 12 having the predetermined length.

Figure 2:
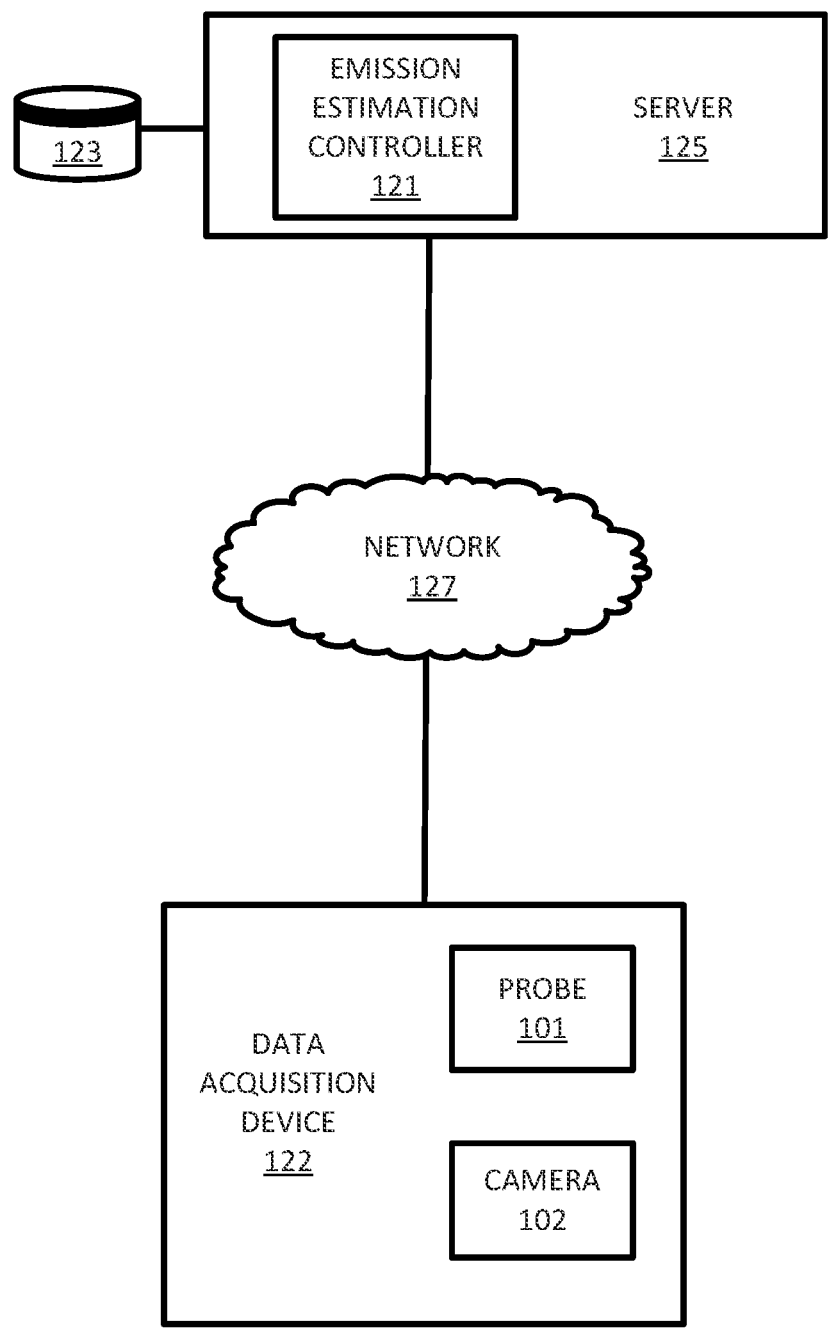
FIG. 2 illustrates an example system for vehicle emission detection.

FIG. 2 illustrates an example system for emission estimation and related applications including a data collection/acquisition device 122, a server 125 including an emission estimation controller 121, and a network 127. Alternatively, data collection device 122 may be replaced by a mobile device such as a smartphone, a tablet computer, or a laptop. The server 125 may be connected to a map database 123 including map data. The map database 123 may alternatively or additionally be in communication with the data collection device 122. Additional, different, or fewer components may be included in the system. The following embodiments may be entirely or substantially performed at the server 125, or the following embodiments may be entirely or substantially performed at the data collection device 122. In some examples, some aspects are performed at the data collection device 122 and other aspects are performed at the server 125.

The data acquisition/collection device 122 may include a probe 101 or position circuitry such as one or more processors or circuits for generating probe data. The probe points are based on sequences of sensor measurements of the probe devices collected in the geographic region. The probe data may be generated by receiving GNSS signals and comparing the GNSS signals to a clock to determine the absolute or relative position of the data collection device 122. The probe data may be generated by receiving radio signals or wireless signals (e.g., cellular signals, the family of protocols known as WiFi or IEEE 802.11, the family of protocols known as Bluetooth, or another protocol) and comparing the signals to a pre-stored pattern of signals (e.g., radio map). The data collection device 122 may act as the probe 101 for determining the position or the data collection device 122 and the probe 101 may be separate devices.

The probe data may include a geographic location such as a longitude value and a latitude value. In addition, the probe data may include a height or altitude. The probe data may be collected over time and include timestamps. In some examples, the probe data is collected at a predetermined time interval (e.g., every second, every 100 milliseconds, or another interval). In this case, there are additional fields like speed and heading based on the movement (i.e., the probe 101 reports location information when the probe 101 moves a threshold distance). The predetermined time interval for generating the probe data may be specified by an application or by the user. The interval for providing the probe data from the data collection device 122 to the server 125 may be the same or different than the interval for collecting the probe data. The interval may be specified by an application or by the user.

The probe data collected by probe 101 may be matched to the map data from the geographic database 123. The data collection device 122 or the server 125 including an emission estimation controller 121 may perform the map-matching. Map-matching is the process of matching a measurement taken by the probe 101 (e.g., a GNSS probe) to a location on a map represented by the map data. Because of the uncertainty in a GNSS measurement, the reported location of the probe 101 may not be the actual location of the probe 101. Map-matching may include an algorithm to reduce any error due to the uncertainty of GNSS probe measurements. The output of map matching is map coordinates that correspond to the location of the probe data.

The location of the probe data may be map matched to a link or a road segment. The link or road segment represents a portion of a road in the map (e.g., road section 12). The link or road segment may be a one-dimensional line that connects to points in the map data. The link or road segment may also represent multiple lanes. The location of the probe may be map matched to an individual lane in the road section 12.

Communication between the data collection device 122 and the server 125 through the network 127 may use a variety of types of wireless networks. Some of the wireless networks may include radio frequency communication. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, 5G, DSRC (dedicated short range communication), or another protocol.

FIG. 2 illustrates a first embodiment of an emission estimation controller 121 for the system of FIG. 1. While FIG. 1 illustrates the emission estimation controller 121 at server 125, the data collection device 122 may also implement the emission estimation controller 121. Additional, different, or fewer components may be included. Other computer architecture arrangements for the emission estimation controller 121 may be used. The emission estimation controller 121 receives data from one or more sources. The data sources may include image data 203 and map data 206, but additional data sources are discussed in other embodiments.

The map data 206 may include one or more data structures including geographic coordinates or other location data for roadways represented by road segments and joined by nodes. In addition, to geographic position, each road segment and node may also be associated with an identifier and one or more attributes.

The emission estimation controller 121 receives image data 203 from the one or more cameras mounted to the collection vehicle 10. The emission estimation controller 121 may receive image data 203 from multiple collection vehicles. In one example, the collection vehicles may be grouped according to distance. That is, the collection vehicles traveling on the same road section 12 may be grouped together for analysis.

The image data 203 may include a set of images collected by the data collection device 122, for example by camera 102. The image data 203 may be aggregated from multiple mobile devices. The image data 203 may be aggregated across a particular service, platform, or application. For example, multiple mobile devices may be in communication with a platform server associated with a particular entity. For example, a vehicle manufacturer may collect video from various vehicles and aggregate the videos. In another example, a map provider may collect image data 203 using an application (e.g., navigation application, mapping application running) running on the data collection device 122.

The image data 203 may be collected automatically. For example, the data collection device 122 may be integrated on the collection vehicle 10 on which the camera 102 is mounted. The images also may be collected for the purpose of detecting objects in the vicinity of the vehicle, determining the position of the vehicle, or providing automated driving or assisted driving. As the vehicle travels along roadways, the camera 102 collects the image data 203.

The position data may include any type of position information and may be determined by the data collection device 122 and stored by the data collection device 122 in response to collection of the image data 203. The position data may include geographic coordinates and at least one angle that describes the viewing angle for the associated image data. The at least one angle may be calculated or derived from the position information and/or the relative size of objects in the image as compared to other images.

The position data and the image data 203 may be combined in geocoded images. A geocoded image has embedded or otherwise associated therewith one or more geographic coordinates or alphanumeric codes (e.g., position data) that associates the image (e.g., image data 203) with the location where the image was collected. The data collection device 122 may be configured to generate geocoded images using the position data collected by the probe 101 and the image data 203 collected by the camera 102.

The position data and the image data 203 may be collected at a particular frequency. Examples for the particular frequency may be 1 sample per second (1 Hz) or greater (more frequent). The sampling frequency for either the position data and the image data 203 may be selected based on the sampling frequency available for the other of the position data and the image data 203. The emission estimation controller 121 is configured to downsample (e.g., omit samples or average samples) in order to equalize the sampling frequency of the position data with the sampling frequency of the image data 203, or vice versa.

The emission estimation controller 121 may include one or more modules for implementing portions of the following embodiments. Example modules may include a vehicle quantity module 211, a vehicle model module 213, and a vehicle classification module 215. The EEC 221 may include two emission tables for estimating vehicle emissions for the one or more surrounding vehicles depicted in the image data 103. The emission tables may include a vehicle model emission coefficient table 212 and a vehicle classification emission coefficient table 214.

The vehicle quantity module 211 may be implemented with a learned model. One example is a neural network trained on historical data for road images including vehicles. The vehicle quantity module 211 (first vehicle model) is accessible by the emission estimation controller 121 to determine a quantity of surrounding vehicles from the image data 203. The vehicle quantity module 211 may be trained on previously taken images where the number of vehicles in the images is known (previously determined) as ground truth. A user (e.g., a human) may inspect the previously taken images to determine the number of vehicles in the images. The number of vehicles in the images are provided to the vehicle quantity module 211 for training the model using the previously taken images.

As the image data 203 is received by the emission estimation controller 121, the image data 203 is passed through the vehicle quantity module 211. The vehicle quantity module 211 outputs the number of vehicles in the image data 203, which is the number of surrounding vehicles for the point in time and the point along the road section 12 where the collection vehicle 10 collected the images.

The vehicle model module 213 and the vehicle classification module 215 analyze modified version of the image data 203. The emission estimation controller 121 is configured to modify the image data 203 to reduce the size of the images collected by the collection vehicle 10. In one example, the emission estimation controller 121 crops the images according to an estimated outline of the vehicle. In other words, the emission estimation controller 121 analyzes the image data 203 and removed background portions such as the roadside, the roadway, the sky, vegetation, and other portions. Rather than identify the background portion for removal, the outline of the vehicles may be identified and retained.

The emission estimation controller 121 may crop the image data 203 using an image processing technique. In one example, the image data 203 is cropped using a scale-invariant feature transform (SIFT). SIFT may perform a specific type of feature extraction that identifies feature vectors in the images and compares pairs of feature vectors. The feature vectors may be compared based on direction and length. The feature vectors may be compared based on the distance between pairs of vectors. The feature vectors may be organized statistically, such as in a histogram. The statistical organization may sort the image descriptors according to edge direction, a pixel gradient across the image window, or another image characteristic.

The vehicle model module 213 may be implemented with a learned model. One example is a neural network trained on historical data for vehicles outlines. The vehicle model module 213 may be trained on images of vehicles having particular makes and/or models that is known (previously determined) as ground truth. A user (e.g., a human) may inspect the previously taken images to determine the make and model of vehicles in the images. The make of the vehicle is the manufacturer. The model of the vehicle may be specific vehicle products by the manufacturer.

The make and/or model of vehicles in the previously taken images are provided to the vehicle model module 213 for training the model using the previously taken images. As the image data 203 is cropped by the emission estimation controller 121, the cropped image is passed through the vehicle model module 213. The vehicle model module 213 outputs the estimated make and/or model of the vehicles in the cropped images. The emission estimation controller 121 may access the vehicle model emission coefficient table 212 using the output of the vehicle model module 213 in order to estimate the emissions of the one or more surrounding vehicles depicted in the image data 103. The estimated emissions (a value for an estimated emission factor) may be transmitted or stored as emission data 231.

The vehicle classification module 215 may be implemented with a learned model. One example is a neural network trained on historic vehicle images. The vehicle classification module 215 is configured to determine a type of vehicle of the surrounding vehicles from the cropped image modified from the image data 203. The type of vehicle may be a classification of vehicle or a body style of the vehicle. Example body styles may include micro, sedan, hatchback, couple, roadster, limousine, sports car, sport utility vehicle, crossover, pickup, van, minivan, bus, camper, recreational vehicle, or any combination thereof.

The classification of the vehicle is a more general description of the vehicle that the make and model. There may be certain vehicles that have a make and model that is particularly difficult to identify. Further, certain models may be hard to distinguish. The classification of a vehicle provides a reasonable estimate of the emission of the vehicle.

The vehicle classification module 215 may be trained on images of vehicles having particular classifications that are known (previously determined) as ground truth. A user (e.g., a human) may inspect the previously taken images to determine the classifications of vehicles in the images. The classifications vehicles in the previously taken images are provided to the vehicle classification module 215 for training the model using the previously taken images. As the image data 203 is cropped by the emission estimation controller 121, the cropped image is passed through the vehicle classification module 215. The vehicle classification module 215 outputs the estimated classifications of the vehicles in the cropped images.

The EEC 221 may access the vehicle classification emission coefficient table 214 using the output of the vehicle classification module 215 in order to estimate the emissions of the one or more surrounding vehicles depicted in the image data 103. The estimated emissions (a value for an estimated emission factor) may be transmitted or stored as emission data 231. The calculations for the emission data, including the application of the vehicle quantity module 211, the vehicle model module 213, and/or the vehicle classification module 215 may be repeated for multiple vehicles in each image or for each road section 12. The emission data 231 may include values for multiple vehicles or may be the resultant value of the average of emission factors for multiple vehicles. In addition, calculations for the emission data, including the application of the vehicle quantity module 211, the vehicle model module 213, and/or the vehicle classification module 215 may be repeated for multiple road sections 12.

The estimated emission levels may be used in a variety of applications. The emission estimation controller 121 may send the emission data 231 to external device 250. The emission estimation controller 121 may store the estimated emission level for the road section 12 in connection with the map matched location in database 123. By repeating the estimation for emission levels at multiple road sections 12 (multiple locations). The EEC 221 may generate a map including the roadway section 12 the emission measurement factor. That is, the emission estimation controller 121 may store estimated emission values in the database 123 to create a table of locations paired with estimated emission levels. The map may include regions associated with various emission levels (low, high, medium). The map may include alternative routes with ratings for associated emission levels. The map may also be used to track CO2 emissions over time (averaged over a long time period) in order to build better road networks and contribute to sustainable city planning.

The emission estimation controller 121 may generate a speed command for the collection vehicle 10 based on the emission measurement factor. For example, the collection vehicle 10 may be instructed to slow down when emission are high (e.g., above a high emission threshold). Alternatively, the speed command may be sent to other vehicles such as vehicles traveling on the road section 12 or on routes that will include the road section 12. Thus, the emission estimation controller 121 may generate a speed recommendation based on the estimated emission level that is forwarded to surrounding vehicles. In some examples, the speed recommendation may be sent directly using vehicle to vehicle (V2V) communication using Bluetooth or Wifi. In other example, the speed recommendation may be routed through external device 250 (e.g., by way of network 127). The external device may distribute speed recommendations to mobile devices 122 (vehicles) based on the locations of the vehicle. The emission estimation controller 121 may generate a travel recommendation based on the emission measurement factor.

Figure 4:
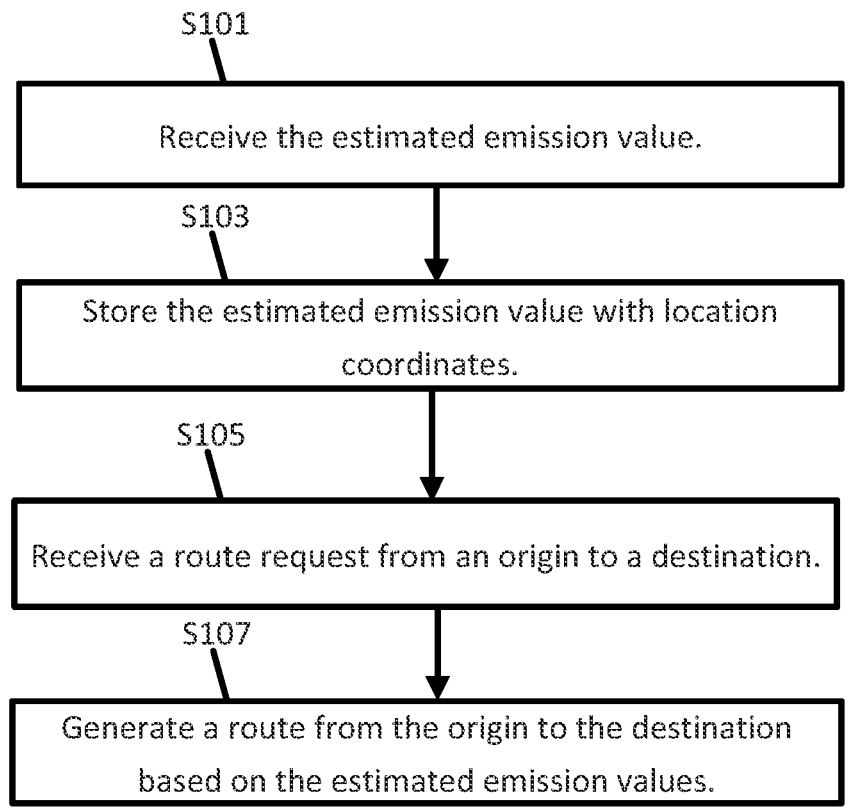
FIG. 4 illustrates an example flow chart for the emission estimation controller.

FIG. 4 illustrates an example flow chart for applications of the estimated emission values in a map database. Additional, different, or fewer acts may be included.

At act S101, the emission estimation controller 121 sends the estimated emission value with corresponding location coordinates to a map developer device. At act S103, the map developer device stores the estimated emission value with the location coordinates or a road segment matched with the location coordinates. At act S105, a request for a route is received at the map developer device. The route request may specify a destination or an origin and destination.

At act S107, the map developer device calculates a route based on the estimated emission values. The emission estimation controller 121 may generate a route based on the emission measurement factor. The emission estimation controller 121 may compare different routes between an origin location and a destination location. Each route may include a set of road segments or links that when combined, form a continuous route or path between the origin location and the destination location. The emission estimation controller 121 may add or otherwise calculated a total emission value for each of the routes using the set of road segments for the route. For example, the emission data 231 for each of the road sections 12 making up the route may be added to calculate the total emission value. The emission estimation controller 121 may compare the total emission values for various routes and recommend the route having the lowest total emission value.

In other examples, the recommended route is directly calculated from the emission data 231. A navigation application may assign weights to each of the road segments in a potential weight. Using only distance would provide the shortest route. Using distance and average speed would provide the quickest route. The emission estimation controller 121 may use the emission data 231 as a weight. Combining distance, average speed, and emission, the emission estimation controller 121 may provide the route which is not necessarily the shortest or quickest but is the best route when emissions are also taken into account. Other weighted factors that may be used to calculate the route between the origin location to the destination location may include traffic, functional classification of the road, elevation, and others.

Figure 3:
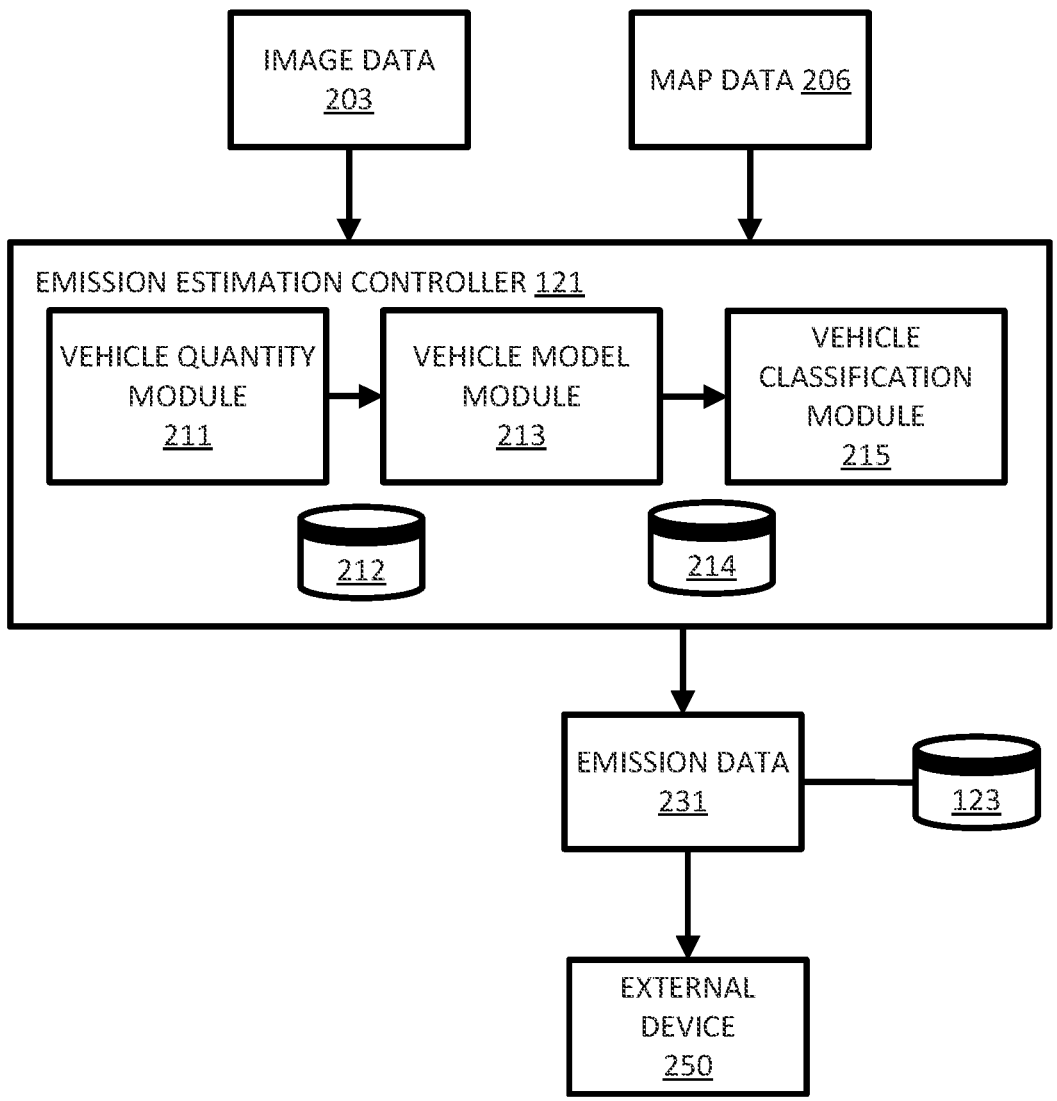
FIG. 3 illustrates an emission estimation controller for the system of FIG. 1.
Figure 5:
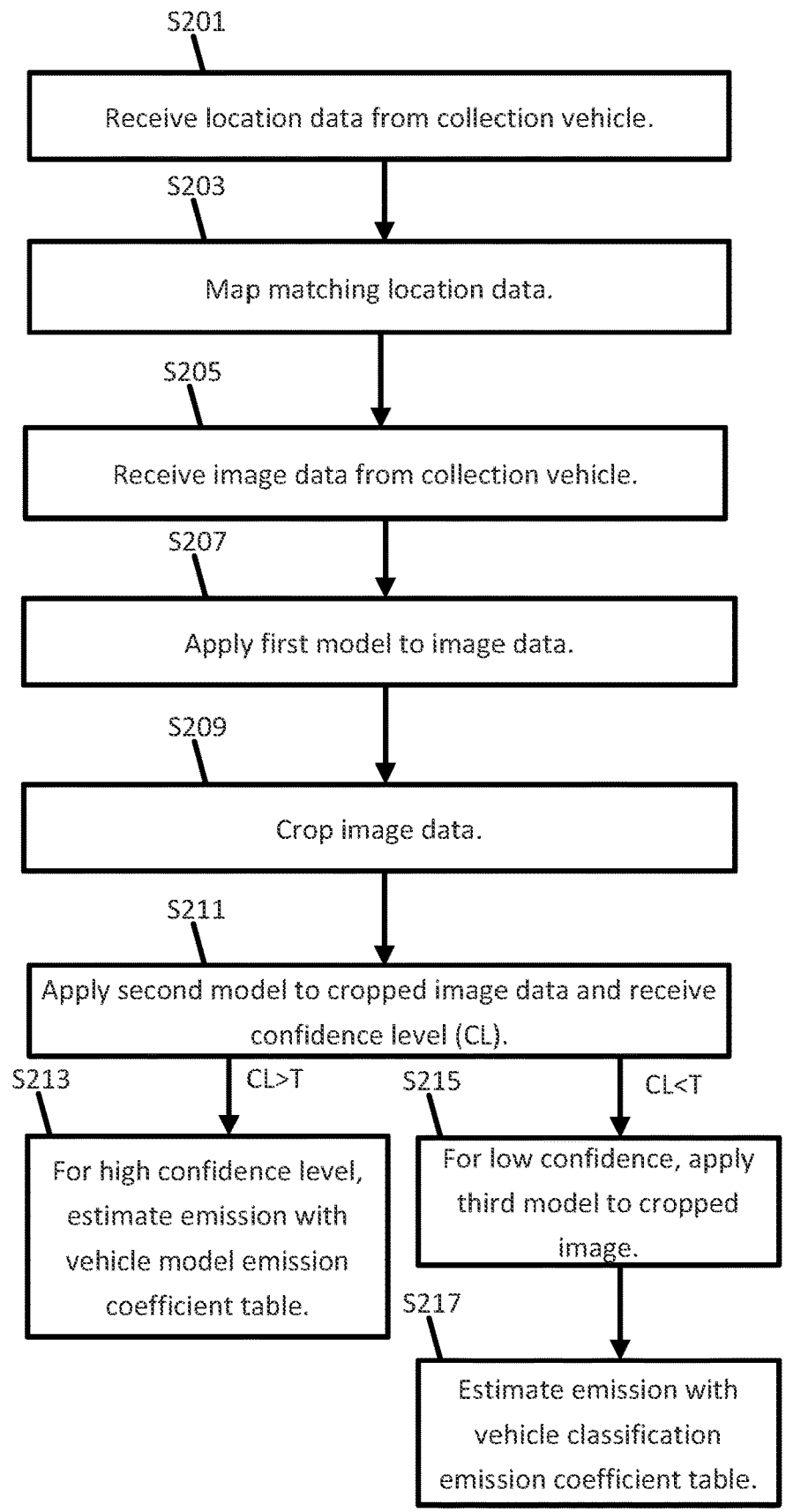
FIG. 5 illustrates an example flow chart for an application of the vehicle emission estimation.

FIG. 5 illustrates an example flow chart for the apparatus of FIGS. 1-3. Additional, different, or fewer acts may be included. The steps of FIG. 5 may be repeated in whole or any combination for each road section 12, geographic area, time interval, or other delineation.

At act S201, the emission estimation controller 121 receives location data from the collection vehicle 10. At act S203, the emission estimation controller 121 map matches the location data to map data from the map database 123. At act S205, the emission estimation controller 121 receives image data 103 from the collection vehicle 10 collected at the location described by the location data, which may be a particular road segment. The emission estimation controller 121 may receive the location data and the image data 103 together in a single transmission.

At act S207, the emission estimation controller 121 applies the vehicle quantity model module 211 (first model) to the image data 103 to determine a quantity of vehicles in proximity to the collection vehicle 10.

At act S209, the emission estimation controller 121 crops, or otherwise modifies, the image data 103. The emission estimation controller 121 may crop the image according to outline of the vehicles depicting in the image data 103. The cropped image may be applied to one or more additional models identified by the emission estimation controller 121, as described in acts S111-S117.

At act S211, the emission estimation controller 121 applies the vehicle model module 213 (second model) to identify a vehicle make and/or vehicle model from the cropped image. The emission estimation controller 121 also calculates a confidence value for the identification of the vehicle make and/or vehicle model. When the vehicle model module 213 includes a neural network, the neural network may also output the confidence level. The emission estimation controller 121 may compare the confidence value to a threshold value in order to select how the emission estimation is determined. When the confidence value is above a threshold value (e.g., 0.6), the output of the vehicle model module 213 is outputted, as shown in S113. At act S113, the emission estimation controller 121 estimates emissions with a vehicle model emission coefficient table.

For the high confidence level above the threshold value, the emission estimation controller 121 may query Table 1 for the emission measurement factor. Each possible identified vehicle make and/or vehicle model from the vehicle model module 213 is associated in Table 1 with an emission measurement factor.

TABLE 1

| Vehicle model | Emission Factor (Kg CO2e/Km) |
| --- | --- |
| Model1 | 0.33 |
| Model2 | 0.28 |
| Model3 | 0.26 |
| Model4 | 0.4 |
| — | — |
| — | — |

Sometimes one or more vehicles in the cropped image is not identified. Sometimes one or more vehicles identified from the cropped image are older models (e.g., more than 10 years old) that may no longer be accurately estimated by Table 1. In these instances, the emission measurement factor may be modified to accommodate unreliable or out of date performance. The emission estimation controller 121 may increase the emission measurement factor by a coefficient. The coefficient may be configurable. One example for the coefficient is 0.9. The emission estimation controller 121 may divide the emission measurement factor by the coefficient when the one or more vehicles in the cropped image is not identified or identified as being an older model.

At act S215, the emission estimation controller 121 applies the classification module 215 (third model). When the confidence value is less than the threshold value, the emission estimation controller 121 determines a vehicle structure for the at least one surrounding vehicle using the classification module 215. The vehicle structure may be a type of car (e.g., small car, mid-size car, sport utility vehicle, small truck, or large truck). The emission estimation controller 121 applies the cropped image to the vehicle classification module 215, which was trained on vehicle classifications.

At act S217, the emission estimation controller 121 estimates emissions with a vehicle classification emission coefficient table (Table 2) based on the output of the vehicle classification module 215.

TABLE 2

| Vehicle classification | Emission Factor (Kg CO2e/unit) |
| --- | --- |
| Small car | 0.22 |
| Mid-size car | 0.25 |
| Sport utility vehicle | 0.28 |
| Small truck | 0.30 |
| Large truck | 0.40 |
| — | — |

The ECE 121 calculates an emission measurement factor for the section of roadway based on at least the quantity of surrounding vehicles for the at least one of the surrounding vehicles according to Equation 1:

$$\text{Emission} = \text{distance travelled by the vehicle} * \text{Emission factor} \quad \text{Eq. 1}$$

For each road section 12, for each sample, or for each predetermined distance (1 Km), the ECE 121 emissions factor is derived Table 1 or Table 2. The distance travelled by the vehicle may be set to 1.

In other examples, the distance travelled may be determined by the number of consecutive images collected by the collection vehicle 10 that includes the identified vehicle.

In addition, if more than one vehicle is estimating the CO2e for the same road section 12 (e.g., 1 Km stretch) then the values are averaged. The emission measurement factors may be averaged.

If the road section 12 (e.g., 1 Km stretch) is different for different vehicles, then a clustering algorithm is used for each Km range to estimate the emissions. The centroid of the cluster is marked as the label.

Figure 6:
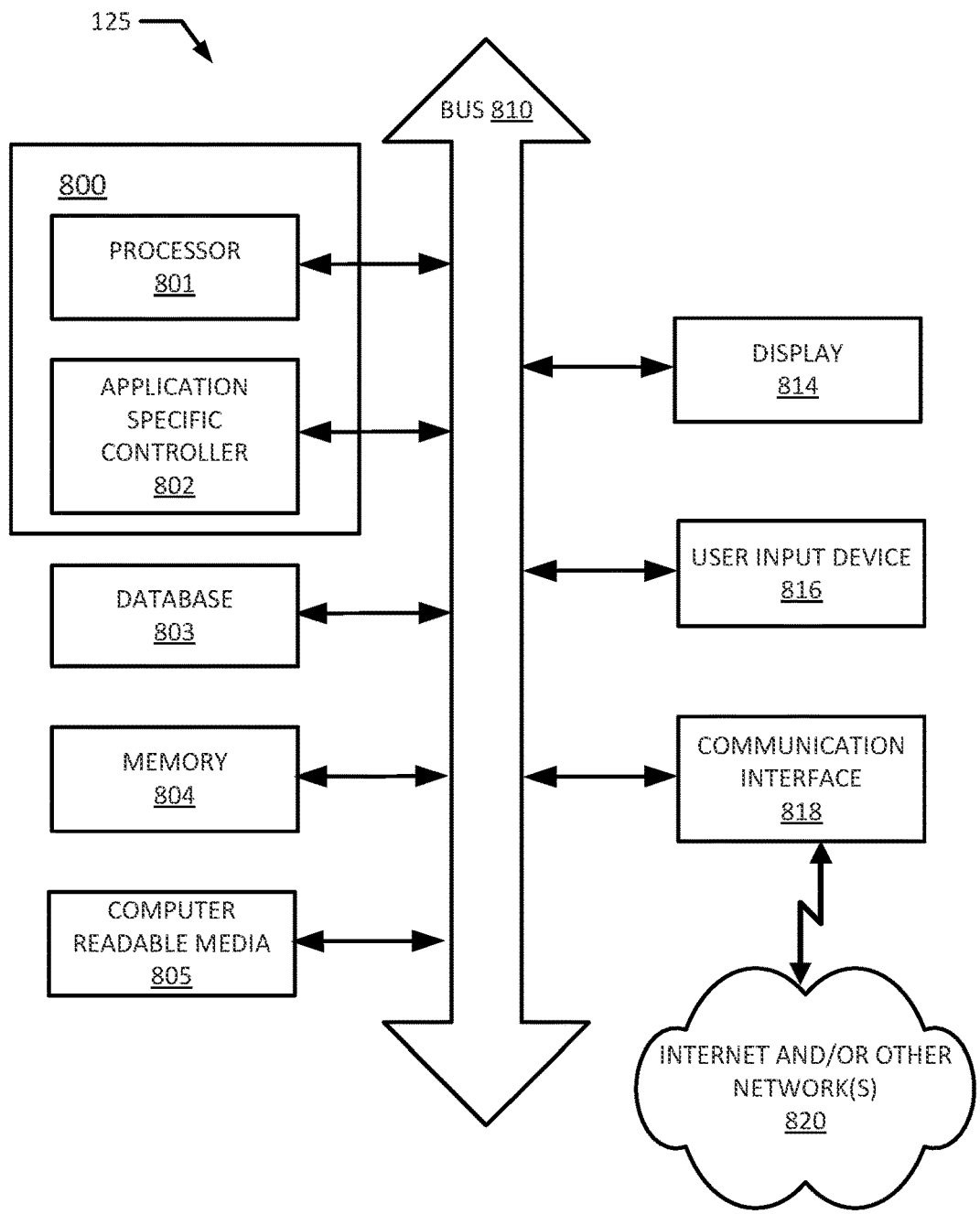
FIG. 6 illustrates an example server for the system of FIG. 1.

FIG. 6 illustrates an example server 125 for the system of FIG. 1. The server 125 may include a bus 810 that facilitates communication between a controller (e.g., the emission estimation controller 121) that may be implemented by a processor 801 and/or an application specific controller 802, which may be referred to individually or collectively as controller 800, and one or more other components including a database 803, a memory 804, a computer readable medium 805, a display 814, a user input device 816, and a communication interface 818 connected to the internet and/or other networks 820. The contents of database 803 are described with respect to database 123. The server-side database 803 may be a master database that provides data in portions to the database 903 of the data collection device 122. Additional, different, or fewer components may be included.

The display 814 may be configured to display information for the emission data 231. Rather than or in addition to the display 814, an indicator (e.g., a light or LED) may provide an indication that emission levels are high. The user input device 816 may receive a setting for the emission estimation. The setting may indicate a value that determines when the emission factor is high. The setting may indicate a confidence level for the emission analysis such as the confidence level described herein that determines whether the model coefficient table or the classification coefficient table is used.

The memory 804 and/or the computer readable medium 805 may include a set of instructions that can be executed to cause the server 125 to perform any one or more of the methods or computer-based functions disclosed herein. In a networked deployment, the system of FIG. 6 may alternatively operate or as a client user computer in a client-server user network environment, or as a peer computer system in a peer-to-peer (or distributed) network environment. It can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. While a single computer system is illustrated, the term "system" shall also be taken to include any collection of systems or sub-systems that individually or jointly execute a set, or multiple sets, of instructions to perform one or more computer functions.

Figure 7:
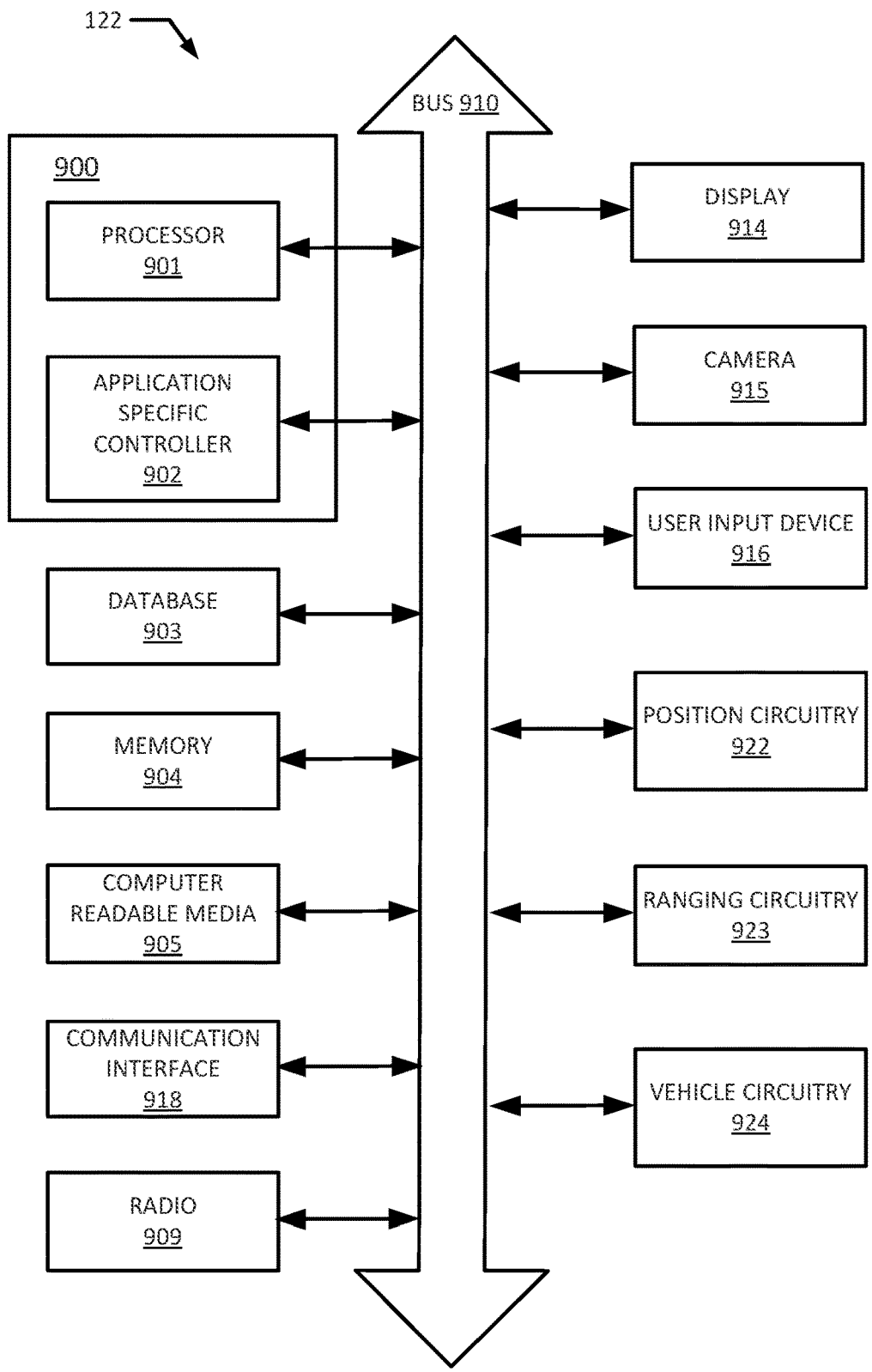
FIG. 7 illustrates an example mobile device for the system of FIG. 1.

FIG. 7 illustrates an example data collection device 122 for the system of FIG. 1. The data collection device 122 may include a bus 910 that facilitates communication between a controller (e.g., the emission estimation controller 121) that may be implemented by a processor 901 and/or an application specific controller 902, which may be referred to individually or collectively as controller 900, and one or more other components including a database 903, a memory 904, a computer readable medium 905, a communication interface 918, a radio 909, a display 914, a camera 915, a user input device 916, position circuitry 922, ranging circuitry 923, and vehicle circuitry 924. The contents of the database 903 are described with respect to database 123. The device-side database 903 may be a user database that receives data in portions from the database 903 of the data collection device 122. The communication interface 918 connected to the internet and/or other networks (e.g., network 820 shown in FIG. 7). The vehicle circuitry 924 may include any of the circuitry and/or devices described with respect to FIG. 10. Additional, different, or fewer components may be included.

Figure 8:
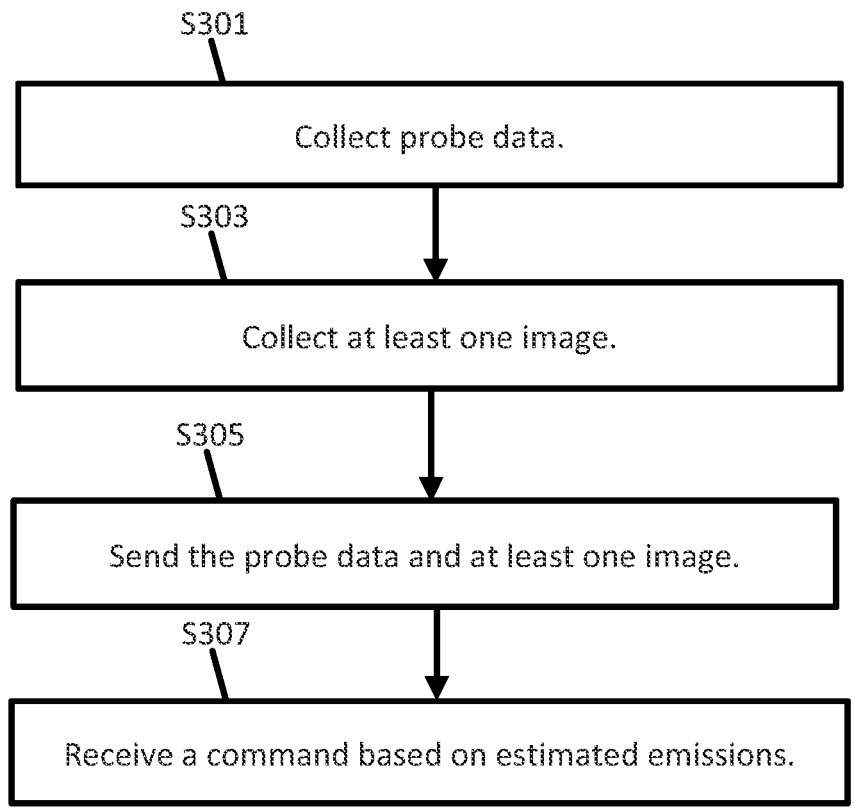
FIG. 8 illustrates an example flow chart for the mobile device of FIG. 8.

FIG. 8 illustrates an example flow chart for the collection vehicle 10 or a data acquisition device (mobile device) 122 associated with the collection vehicle 10. Additional, different, or fewer acts may be included.

At act S301, the collection vehicle 10 collects probe data. At act S303, the collection vehicle 10 collects at least one image. The image collection may be triggered at a specific time interval determined by the processor 901 using a timer. The image collected may be triggered at a specific distance interval as determined by the processor 901 by comparing probe data over time.

At act S303, the collection vehicle 10 associates probe data indicative of where the image was collected and sends probe data and the at least one image together via the communication interface 918 or the radio 909 to the emission estimation controller 121.

The emission estimation controller 121 processes the at least one image and calculates the estimated emission value in response to the analysis of the at least one image. The emission estimation controller 121 generates a command (e.g., driving command, routing command, data collection command). At act S305, the emission estimation controller 121 sends the commend based on the estimated emission value to the collection vehicle 10 or another vehicle.

For a navigation application, discussed in more detail below, many factors may go into calculation of a route between an origin and a destination. Factors include distance, time, traffic, functional classification of the road, elevation, and others. An additional factor may be the estimated emission value. For a driving assistance application, certain features may depend on estimated emission value. A speed governor may be applied when emission levels are high. An emission reduction device may be activated when emission levels are high.

Figure 9:
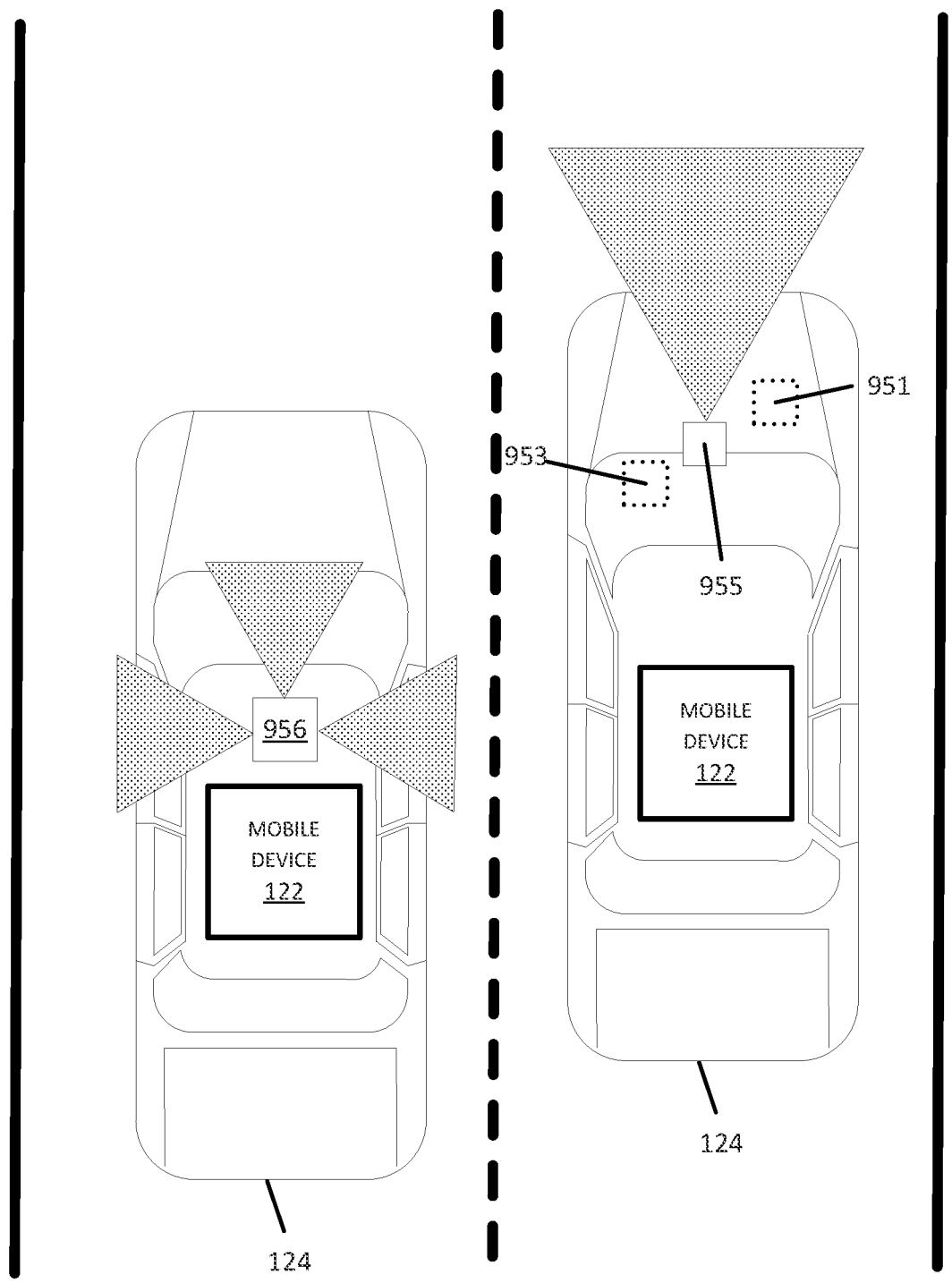
FIG. 9 illustrates exemplary vehicles for the system of FIG. 1.

FIG. 9 illustrates an exemplary vehicle 124 associated with the system of FIG. 2 for providing location-based services. The vehicles 124 may include a variety of devices that collect position data as well as other related sensor data for the surroundings of the vehicle 124. The position data may be generated by a global positioning system, a dead reckoning-type system, cellular location system, or combinations of these or other systems, which may be referred to as position circuitry or a position detector. The positioning circuitry may include suitable sensing devices that measure the traveling distance, speed, direction, and so on, of the vehicle 124. The positioning system may also include a receiver and correlation chip to obtain a GPS or GNSS signal. Alternatively or additionally, the one or more detectors or sensors may include an accelerometer built or embedded into or within the interior of the vehicle 124. The vehicle 124 may include one or more distance data detection device or sensor, such as a LIDAR device. The distance data detection sensor may generate point cloud data. The distance data detection sensor may include a laser range finder that rotates a mirror directing a laser to the surroundings or vicinity of the collection vehicle on a roadway or another collection device on any type of pathway. The distance data detection device may generate the trajectory data. Other types of pathways may be substituted for the roadway in any embodiment described herein.

A connected vehicle includes a communication device and an environment sensor array for reporting the surroundings of the vehicle 124 to the server 125. The connected vehicle may include an integrated communication device coupled with an in-dash navigation system. The connected vehicle may include an ad-hoc communication device such as a data collection device 122 or smartphone in communication with a vehicle system. The communication device connects the vehicle to a network including at least one other vehicle and at least one server. The network may be the Internet or connected to the internet.

The sensor array may include one or more sensors configured to detect surroundings of the vehicle 124. The sensor array may include multiple sensors. Example sensors include an optical distance system such as LiDAR 956, an image capture system 955 such as a camera, a sound distance system such as sound navigation and ranging (SONAR), a radio distancing system such as radio detection and ranging (RADAR) or another sensor. The camera may be a visible spectrum camera, an infrared camera, an ultraviolet camera, or another camera.

In some alternatives, additional sensors may be included in the vehicle 124. An engine sensor 951 may include a throttle sensor that measures a position of a throttle of the engine or a position of an accelerator pedal, a brake senor that measures a position of a braking mechanism or a brake pedal, or a speed sensor that measures a speed of the engine or a speed of the vehicle wheels. Another additional example, vehicle sensor 953, may include a steering wheel angle sensor, a speedometer sensor, or a tachometer sensor.

A mobile device may be integrated in the vehicle 124, which may include assisted driving vehicles such as autonomous vehicles, highly assisted driving (HAD), and advanced driving assistance systems (ADAS). Any of these assisted driving systems may be incorporated into the mobile device. Alternatively, an assisted driving device may be included in the vehicle 124. The assisted driving device may include memory, a processor, and systems to communicate with the mobile device.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle. The autonomous vehicle may slow down in response to high emission levels. The autonomous vehicle may turn or otherwise take a different route or path in response to high emission levels. Thus, the autonomous vehicle controls driving operations in response to the emission data 231 received from geographic database 123 and the server 125 and driving commands or navigation commands.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the position of the vehicle and based on the emission data 231 received from geographic database 123 and the server 125 and driving commands or navigation commands.

The controller 900 may communicate with a vehicle ECU which operates one or more driving mechanisms (e.g., accelerator, brakes, steering device). Alternatively, the mobile device may be the vehicle ECU, which operates the one or more driving mechanisms directly.

The controller 800 or 900 may include a routing module including an application specific module or processor that calculates routing between an origin and destination. The routing module is an example means for generating a route in response to the anonymized data to the destination. The routing command may be a driving instruction (e.g., turn left, go straight), which may be presented to a driver or passenger, or sent to an assisted driving system. The display 914 is an example means for displaying the routing command.

The routing instructions may be provided by display 914. The mobile device may be configured to execute routing algorithms to determine an optimum route to travel along a road network from an origin location to a destination location in a geographic region, utilizing, at least in part, the map layer including the emission calculations. Certain road segments with heavy emission may be avoided or weighted lower than other possible paths. Using input(s) including map matching values from the server 125, a mobile device examines potential routes between the origin location and the destination location to determine the optimum route. The mobile device, which may be referred to as a navigation device, may then provide the end user with information about the optimum route in the form of guidance that identifies the maneuvers required to be taken by the end user to travel from the origin to the destination location. Some mobile devices 122 show detailed maps on displays outlining the route, the types of maneuvers to be taken at various locations along the route, locations of certain types of features, and so on. Possible routes may be calculated based on a Dijkstra method, an A-star algorithm or search, and/or other route exploration or calculation algorithms that may be modified to take into consideration assigned cost values of the underlying road segments.

The mobile device may be a personal navigation device ("PND"), a portable navigation device, a mobile phone, a personal digital assistant ("PDA"), a watch, a tablet computer, a notebook computer, and/or any other known or later developed mobile device or personal computer. The mobile device may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The geographic database 123 may include map data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the map data. The map data may include structured cartographic data or pedestrian routes. The map data may include map features that describe the attributes of the roads and intersections. The map features may include geometric features, restrictions for traveling the roads or intersections, roadway features, or other characteristics of the map that affects how vehicles 124 or mobile device for through a geographic area. The geometric features may include curvature, slope, or other features. The curvature of a road segment describes a radius of a circle that in part would have the same path as the road segment. The slope of a road segment describes the difference between the starting elevation and ending elevation of the road segment. The slope of the road segment may be described as the rise over the run or as an angle. The geographic database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The databases may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The geographic database 123 may contain at least one road segment database record 304 (also referred to as "entity" or "entry") for each road segment in a particular geographic region. The geographic database 123 may also include a node database record (or "entity" or "entry") for each node in a particular geographic region. The terms "nodes" and "segments" represent only one terminology for describing these physical geographic features, and other terminology for describing these features is intended to be encompassed within the scope of these concepts. The geographic database 123 may also include location fingerprint data for specific locations in a particular geographic region.

The radio 909 may be configured to radio frequency communication (e.g., generate, transit, and receive radio signals) for any of the wireless networks described herein including cellular networks, the family of protocols known as WiFi or IEEE 802.11, the family of protocols known as Bluetooth, or another protocol.

The memory 804 and/or memory 904 may be a volatile memory or a non-volatile memory. The memory 804 and/or memory 904 may include one or more of a read only memory (ROM), random access memory (RAM), a flash memory, an electronic erasable program read only memory (EEPROM), or other type of memory. The memory 904 may be removable from the mobile device, such as a secure digital (SD) memory card.

The communication interface 818 and/or communication interface 918 may include any operable connection. An operable connection may be one in which signals, physical communications, and/or logical communications may be sent and/or received. An operable connection may include a physical interface, an electrical interface, and/or a data interface. The communication interface 818 and/or communication interface 918 provides for wireless and/or wired communications in any now known or later developed format.

The input device 916 may be one or more buttons, keypad, keyboard, mouse, stylus pen, trackball, rocker switch, touch pad, voice recognition circuit, or other device or component for inputting data to the mobile device. The input device 916 and display 914 be combined as a touch screen, which may be capacitive or resistive. The display 914 may be a liquid crystal display (LCD) panel, light emitting diode (LED) screen, thin film transistor screen, or another type of display. The output interface of the display 914 may also include audio capabilities, or speakers. In an embodiment, the input device 916 may involve a device having velocity detecting abilities.

The ranging circuitry 923 may include a LIDAR system, a RADAR system, a structured light camera system, SONAR, or any device configured to detect the range or distance to objects from the mobile device.

The positioning circuitry 922 may include suitable sensing devices that measure the traveling distance, speed, direction, and so on, of the mobile device. The positioning system may also include a receiver and correlation chip to obtain a GPS signal. Alternatively or additionally, the one or more detectors or sensors may include an accelerometer and/or a magnetic sensor built or embedded into or within the interior of the mobile device. The accelerometer is operable to detect, recognize, or measure the rate of change of translational and/or rotational movement of the mobile device. The magnetic sensor, or a compass, is configured to generate data indicative of a heading of the mobile device. Data from the accelerometer and the magnetic sensor may indicate orientation of the mobile device. The mobile device receives location data from the positioning system. The location data indicates the location of the mobile device.

The positioning circuitry 922 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 922 may include suitable sensing devices that measure the traveling distance, speed, direction, and so on, of the mobile device. The positioning system may also include a receiver and correlation chip to obtain a GPS signal. The mobile device receives location data from the positioning system. The location data indicates the location of the mobile device.

The position circuitry 922 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network devices.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data.

Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. These examples may be collectively referred to as a non-transitory computer readable medium.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

One or more embodiments of the disclosure may be referred to herein, individually, and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for vehicle emission measurement, the method comprising:
 receiving a plurality of images from a first vehicle traveling on a section of roadway;
 determining a quantity of surrounding vehicles from the plurality of images;
 determining a cropped image of at least one of the surrounding vehicles from the plurality of images;
 identifying a model of the at least one of the surrounding vehicles from the cropped image;
 calculating an emission measurement factor for the section of roadway based on at least the quantity of surrounding vehicles for the at least one of the surrounding vehicles; and
 generating a speed command for the first vehicle based on the emission measurement factor.

2. The method of claim 1, further comprising:
 calculating a confidence value for the identification of the model of the at least one of the surrounding vehicles; and
 comparing the confidence value to a threshold value.

3. The method of claim 2, wherein when the confidence value is greater than the threshold value, the emission measurement factor is determined based on the quantity of surrounding vehicles and the identified model for the at least one of the surrounding vehicles.

4. The method of claim 2, further comprising:
when the confidence value is less than the threshold value, determining a vehicle structure for the at least one surrounding vehicle.

5. The method of claim 4, wherein when the confidence value is less than the threshold value, the emission measurement factor is determined based on the quantity of surrounding vehicles and the vehicle structure for the at least one of the surrounding vehicles.

6. The method of claim 5, wherein determining the vehicle structure comprises:
identifying a type of vehicle selected from a group comprising: small car, mid-size car, sport utility vehicle, small truck, or large truck.

7. The method of claim 5, wherein determining the vehicle structure comprises:
applying the cropped image to a vehicle classification neural network model trained on vehicle classifications; and
receiving data indicative of the vehicle structure from the vehicle classification neural network model.

8. The method of claim 1, wherein determining a quantity of surrounding vehicles from the plurality of images comprises:
applying the plurality of images to a vehicle quantity neural network model trained on historical observations of vehicle quantities; and
receiving data indicative of the quantity of surrounding vehicles from the vehicle quantity neural network model.

9. The method of claim 1, wherein identifying a model of the at least one of the surrounding vehicles from the cropped image comprises:
applying the cropped image to a vehicle model neural network model trained on historical observations of vehicle models; and
receiving data indicative of the model of vehicle from the vehicle model neural network model.

10. The method of claim 1, further comprising:
generating a map including the section of roadway and the emission measurement factor.

11. The method of claim 1, further comprising:
generating a travel recommendation based on the emission measurement factor.

12. The method of claim 1, further comprising:
generating a route based on the emission measurement factor.

13. An apparatus for vehicle emission determination, the apparatus comprising:
an emission estimation controller configured to receive a plurality of images from a first vehicle traveling on a section of roadway;
a first vehicle model, accessible by the emission estimation controller, configured to determine a quantity of surrounding vehicles from the plurality of images;
a second vehicle model, accessible by the emission estimation controller, configured to identify a model of at least one of the surrounding vehicles from a cropped image identified from the plurality of images; and
a third vehicle model, accessible by the emission estimation controller, configured to determine a type of vehicle of the at least one of the surrounding vehicles from the cropped image identified from the plurality of images,
wherein the emission estimation controller is configured to calculate an emission measurement factor for the section of roadway based on the quantity of surrounding vehicles for the at least one of the surrounding vehicles and based on the model of the at least one surrounding vehicles or the type of vehicles, wherein the emission estimation controller is configured to generate a speed command based on the emission measurement factor.

14. The apparatus of claim 13, wherein the emission estimation controller is configured to calculate a confidence value for the identification of the model of the at least one of the surrounding vehicles.

15. The apparatus of claim 14, wherein the emission estimation controller is configured to compare the confidence value to a threshold value and calculations of the emission measurement factor is based on the comparison.

16. The apparatus of claim 15, wherein when the confidence value is greater than the threshold value, the emission measurement factor is determined based on the quantity of surrounding vehicles and the identified model for the at least one of the surrounding vehicles.

17. The apparatus of claim 15, wherein when the confidence value is less than the threshold value, the emission measurement factor is determined based on the quantity of surrounding vehicles and the type of vehicle for the at least one of the surrounding vehicles.

18. The apparatus of claim 14, wherein the type of vehicle is a body style of the vehicle.

19. A non-transitory computer readable medium including instructions that when executed are configured to perform:
receiving an estimated emission value;
storing the estimated emission value with location coordinates;
receiving a route request from an origin to a destination; and
generating a route from the origin to the destination and a speed command based on the estimated emission value.

* * * * *